(12) United States Patent
Tsubaki et al.

(10) Patent No.: US 11,117,490 B2
(45) Date of Patent: Sep. 14, 2021

(54) VEHICLE POWER SUPPLY DEVICE

(71) Applicant: Yazaki Corporation, Tokyo (JP)

(72) Inventors: Kazuya Tsubaki, Shizuoka (JP); Kazuo Sugimura, Shizuoka (JP); Mitsuaki Morimoto, Shizuoka (JP); Eiichiro Oishi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/794,374

(22) Filed: Feb. 19, 2020

(65) Prior Publication Data
US 2020/0290480 A1    Sep. 17, 2020

(30) Foreign Application Priority Data

Mar. 15, 2019   (JP) ............................. JP2019-048616

(51) Int. Cl.
| | |
|---|---|
| *B60L 11/18* | (2006.01) |
| *B60L 58/18* | (2019.01) |
| *B60L 50/60* | (2019.01) |
| *B60L 58/12* | (2019.01) |
| *H01M 50/20* | (2021.01) |

(52) U.S. Cl.
CPC ............... *B60L 58/18* (2019.02); *B60L 50/66* (2019.02); *B60L 58/12* (2019.02); *H01M 50/20* (2021.01); *H01M 2220/20* (2013.01)

(58) Field of Classification Search
CPC .......... B60L 58/21; B60L 58/12; B60L 58/18; B60L 50/66; H02J 7/1423; H02J 7/0024; H02J 2310/48; Y02E 60/10; H01M 50/20; H01M 2220/20
See application file for complete search history.

(56) References Cited

U.S. PATENT DOCUMENTS

| | | | | |
|---|---|---|---|---|
| 7,898,103 | B2 * | 3/2011 | Oyobe .................... | H02J 7/345 307/9.1 |
| 2003/0071466 | A1 * | 4/2003 | Gale ....................... | B60L 50/51 290/40 C |

(Continued)

FOREIGN PATENT DOCUMENTS

| | | |
|---|---|---|
| DE | 10 2016 015 311 A1 | 7/2017 |
| EP | 3 144 186 A1 | 3/2017 |

(Continued)

*Primary Examiner* — Adi Amrany
*Assistant Examiner* — Esayas G Yeshaw
(74) *Attorney, Agent, or Firm* — Sughrue Mion, PLLC

(57) ABSTRACT

In a vehicle power supply device, a switch unit switches mutual connection among first to fourth batteries. When supplying electric power from the first to fourth batteries to a motor, a switch controller controls the switch unit and forms a backup battery corresponding to at least one of the first to fourth batteries that does not supply electric power to the motor and a serial battery group for supplying electric power that has the remaining batteries, except for the backup battery, connected in series. The switch controller supplies electric power from the serial battery group for supplying electric power to the motor, and, when a predetermined condition is satisfied, sequentially switches between a battery included in the serial battery group for supplying electric power and the backup battery.

5 Claims, 8 Drawing Sheets

(56) References Cited

U.S. PATENT DOCUMENTS

| | | | |
|---|---|---|---|
| 2007/0159007 A1* | 7/2007 | King | B60L 58/21 307/71 |
| 2009/0085515 A1* | 4/2009 | Bourilkov | H02J 7/0024 320/117 |
| 2010/0164278 A1* | 7/2010 | Oyobe | B60L 50/61 307/9.1 |
| 2018/0345806 A1* | 12/2018 | Lee | B60L 11/1824 |

FOREIGN PATENT DOCUMENTS

| | | |
|---|---|---|
| JP | 3-70484 A | 3/1991 |
| JP | 2010-172062 A | 8/2010 |
| JP | 2018-085790 A | 5/2018 |

* cited by examiner

VEHICLE POWER SUPPLY DEVICE

CROSS-REFERENCE TO RELATED APPLICATION(S)

The present application claims priority to and incorporates by reference the entire contents of Japanese Patent Application No. 2019-048616 filed in Japan on Mar. 15, 2019.

BACKGROUND OF THE INVENTION

1. Field of the Invention

The present invention relates to a vehicle power supply device.

2. Description of the Related Art

Conventionally, as a vehicle power supply device, for example, Japanese Patent Application Laid-open No. 2018-85790 discloses a battery controller of an electric vehicle that has a plurality of batteries connected in series during charging and has the batteries connected in parallel during traveling.

It is considered that the battery controller of an electric vehicle disclosed in Japanese Patent Application Laid-open No. 2018-85790 is provided with, for example, a spare battery separately and supplies electric power from the spare battery so as to continue traveling when normally used batteries fail. In this kind of battery failure, the battery controller is expected to properly supply electric power.

SUMMARY OF THE INVENTION

In view of the foregoing, an object of the present invention is to provide a vehicle power supply device capable of properly building a power supply system having a backup function.

In order to achieve the above mentioned object, a vehicle power supply device according to one aspect of the present invention includes a plurality of batteries that are mounted on a vehicle and supply electric power to a load unit; a switching unit that is configured to switch mutual connection among the batteries; and a controller that is configured to control the switching unit, wherein when supplying electric power from the batteries to the load unit, the controller controls the switching unit, forms a backup battery that is at least one of the batteries that does not supply electric power to the load unit and a serial battery group for supplying electric power that has the remaining batteries, except for the backup battery, connected in series, supplies electric power from the serial battery group for supplying electric power to the load unit, and, when a predetermined condition is satisfied, sequentially switches between a battery included in the serial battery group for supplying electric power and the backup battery.

According to another aspect of the present invention, in the vehicle power supply device, it is possible to configure that when a charger charges the batteries, the controller controls the switching unit, forms, among the batteries, a plurality of serial battery groups for charging that each have the same number of batteries connected in series and forms a parallel battery group that has the serial battery groups for charging connected in parallel, and charges the parallel battery group with electric power supplied from the charger.

According to still another aspect of the present invention, in the vehicle power supply device, it is possible to configure that when a charging amount of the serial battery group for supplying electric power is lowered than a predetermined reference charging amount, the controller controls the switching unit, forms a serial battery group for emergency that has all of the batteries including the backup battery connected in series, and supplies electric power from the serial battery group for emergency to the load unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

An embodiment for implementing the present invention will be described in detail with reference to the accompanying drawings. It should be noted that the contents in the following embodiment are not intended to limit this invention. Components described below include components that can be easily thought of by the skilled person or substantially like components. Furthermore, configurations described below can be combined as appropriate. Various omissions, substitutions, or changes of the configurations may be made without departing from the spirit of the present invention.

Embodiment

Figure 1:
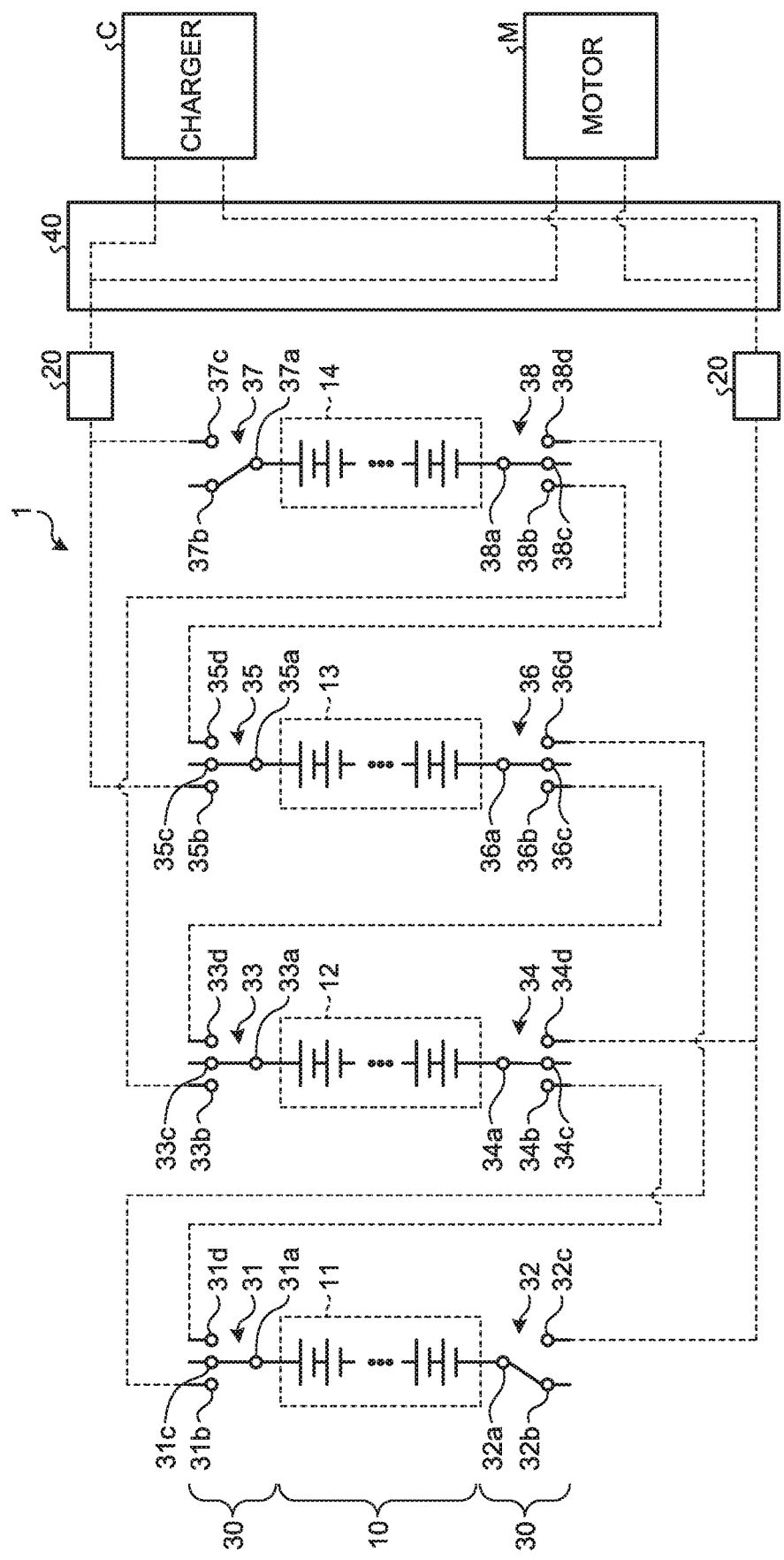
FIG. 1 is a block diagram illustrating a configuration example of a vehicle power supply device according to an embodiment.
Figure 2:
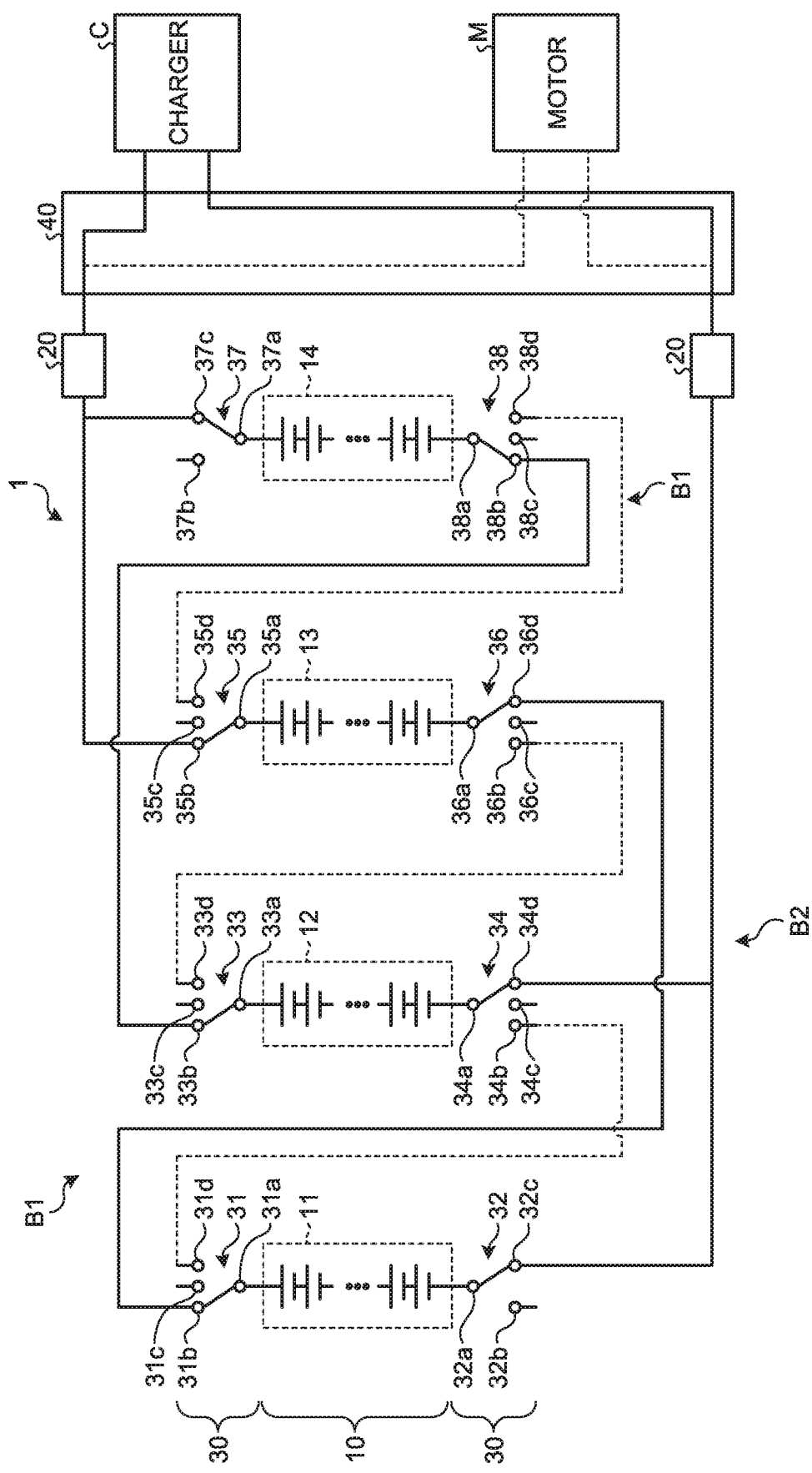
FIG. 2 is a block diagram illustrating a charging example of the vehicle power supply device according to the embodiment.
Figure 3:
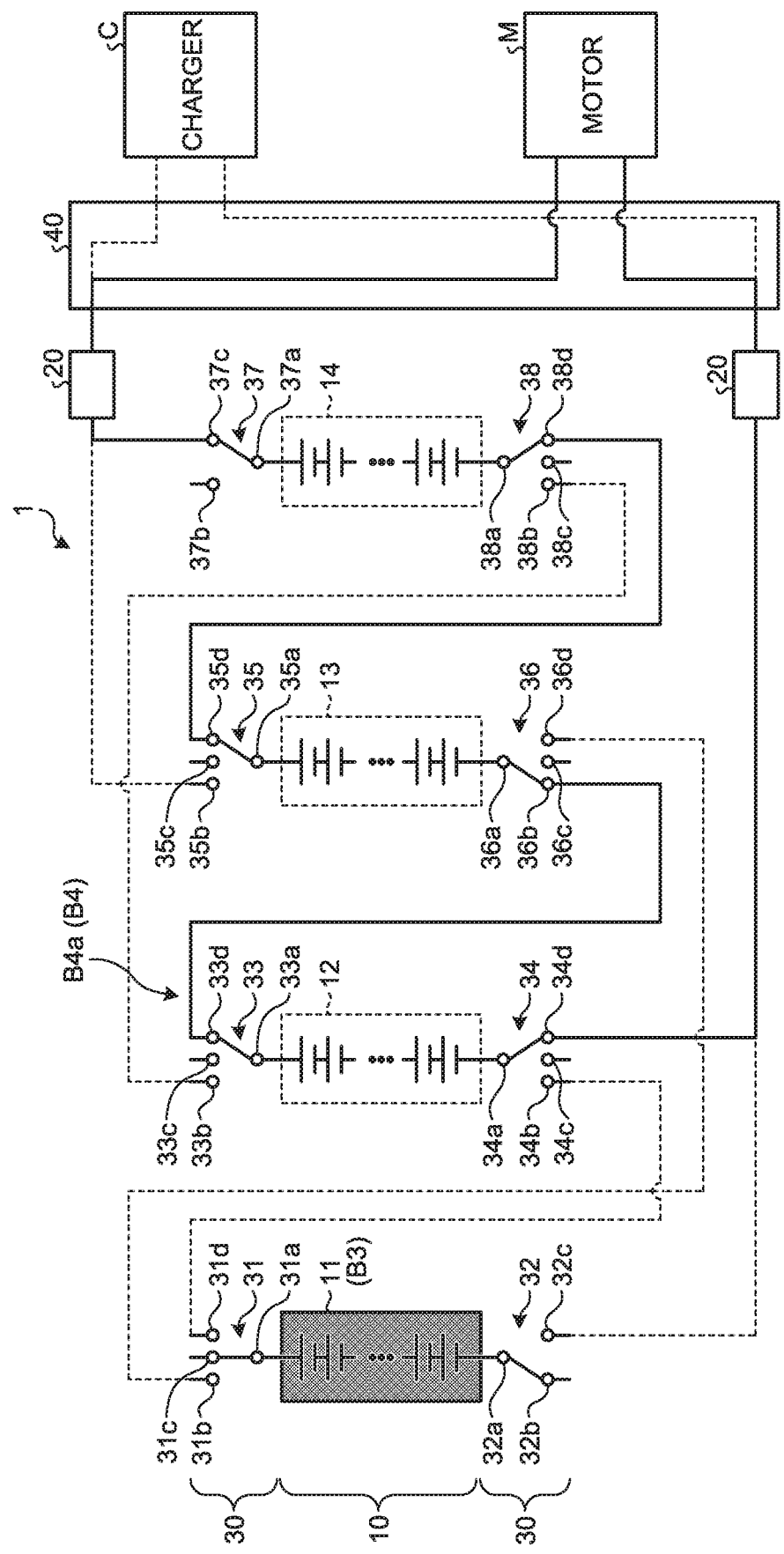
FIG. 3 is a block diagram illustrating a first electric power supplying example of the vehicle power supply device according to the embodiment.
Figure 4:
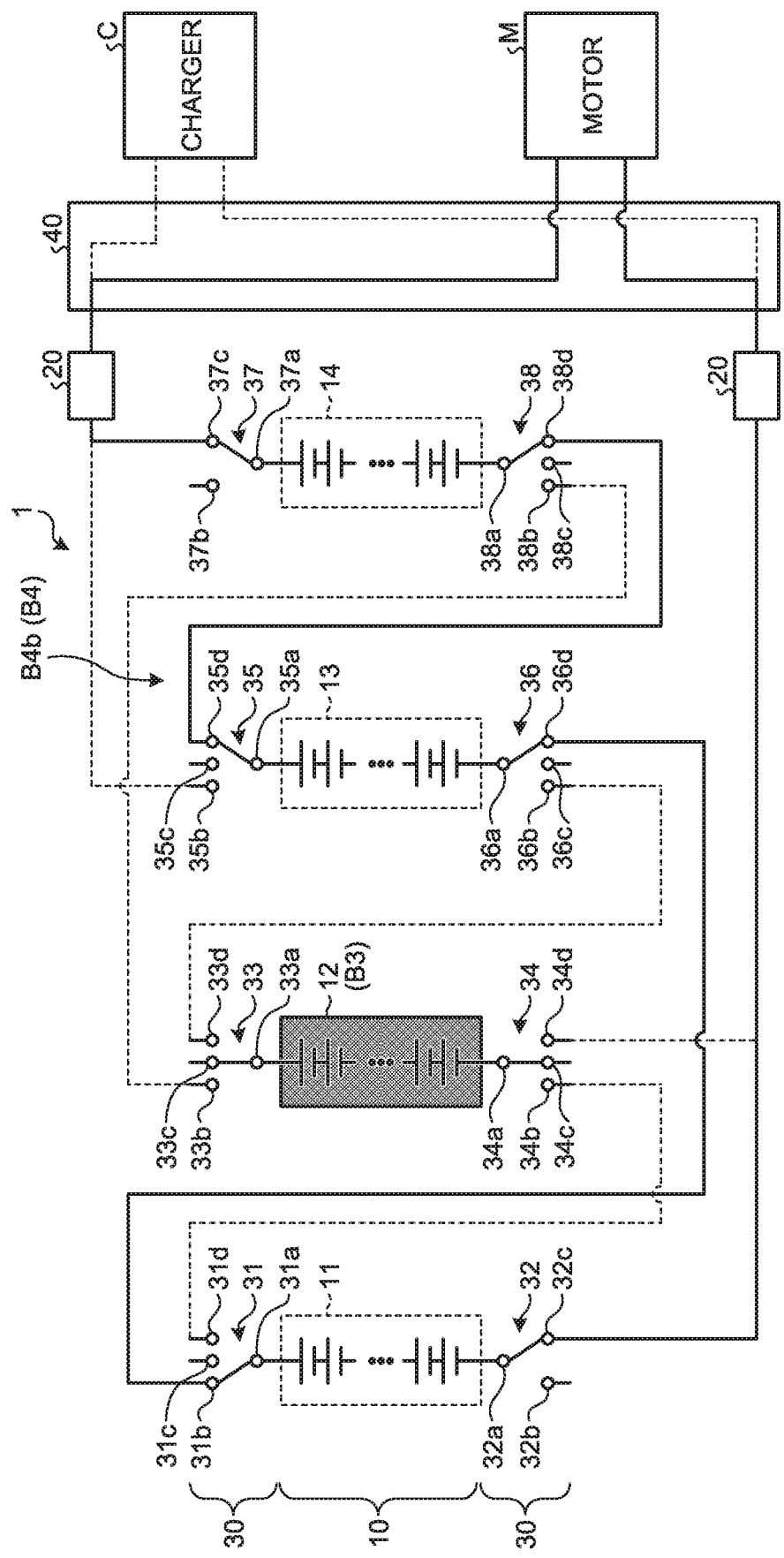
FIG. 4 is a block diagram illustrating a second electric power supplying example of the vehicle power supply device according to the embodiment.
Figure 5:
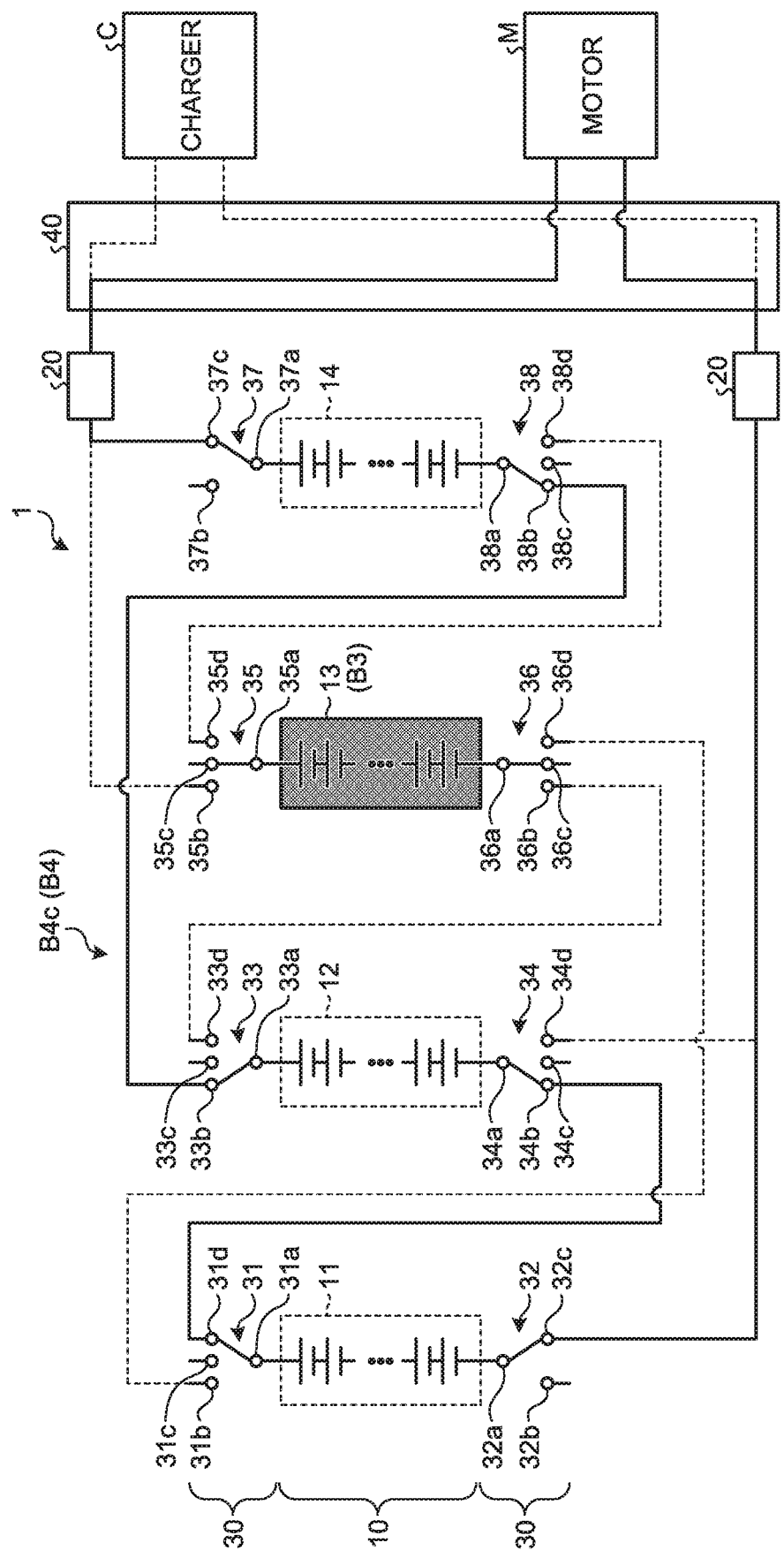
FIG. 5 is a block diagram illustrating a third electric power supplying example of the vehicle power supply device according to the embodiment.
Figure 6:
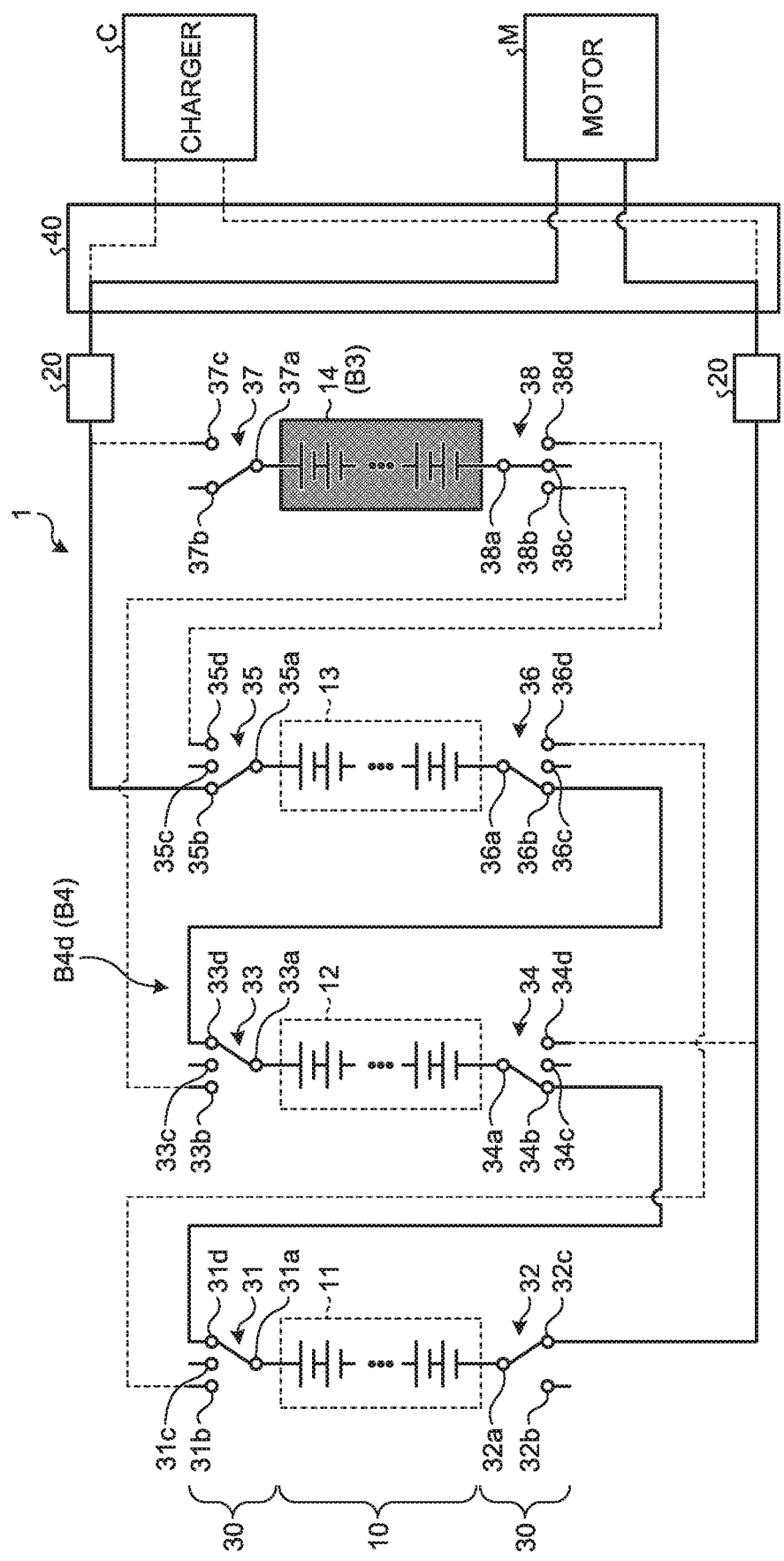
FIG. 6 is a block diagram illustrating a fourth electric power supplying example of the vehicle power supply device according to the embodiment.

A vehicle power supply device 1 according to an embodiment will be described with reference to the drawings. FIG. 1 is a block diagram illustrating a configuration example of the vehicle power supply device 1 according to the embodiment. FIG. 2 is a block diagram illustrating a charging example of the vehicle power supply device 1 according to the embodiment. FIG. 3 is a block diagram illustrating a first electric power supplying example of the vehicle power supply device 1 according to the embodiment. FIG. 4 is a block diagram illustrating a second electric power supplying example of the vehicle power supply device 1 according to the embodiment. FIG. 5 is a block diagram illustrating a third electric power supplying example of the vehicle power supply device 1 according to the embodiment. FIG. 6 is a block diagram illustrating a fourth electric power supplying example of the vehicle power supply device 1 according to the embodiment.

The vehicle power supply device 1 is mounted on a vehicle, and supplies charged electric power to a motor M for traveling (load unit). Examples of a vehicle include electric-powered vehicles such as an electric vehicle (EV), a hybrid electric vehicle (HEV), and a plug-in hybrid electric vehicle (PHEV).

For example, the vehicle power supply device 1 charges a battery unit 10 with electric power supplied from a charger C via an inlet of a vehicle to which a connector of the charger C is connected. The vehicle power supply device 1 supplies the charged electric power to the motor M for traveling. The vehicle power supply device 1 will be described in detail below.

As illustrated in FIG. 1, the vehicle power supply device 1 includes the battery unit 10, breakers 20, a switch unit 30 as a switching unit, and a switch controller 40.

The battery unit 10 is a collective entity of storage batteries capable of charging and discharging with direct-current (DC) power. The battery unit 10 includes, for example, first to fourth batteries 11 to 14 as a plurality of batteries. The first battery 11 is a storage battery capable of charging and discharging with DC power. The first battery 11 includes a plurality of battery cells. Each of the battery cells is formed of a chargeable and dischargeable secondary battery, and is formed of, for example, a lithium-ion battery. Each of the battery cells is connected to the adjacent battery cell in series. The second to fourth batteries 12 to 14 are formed in the same way as the first battery 11. The first to fourth batteries 11 to 14 each have an equal discharged capacity. The battery unit 10 is connected to the charger C, and is charged with electric power supplied from the charger C. The battery unit 10 is connected to the motor M, and supplies the charged electric power to the motor M.

The breakers 20 electrically connect or disconnect the battery unit 10 to or from the charger C and the motor M. For example, the breaker 20 is arranged between the battery unit 10 and the charger C. When the charger C charges the battery unit 10 and the charger C is short-circuited, the breaker 20 disconnects the battery unit 10 from the charger C. The breaker 20 is arranged between the battery unit 10 and the motor M. For example, when electric power is supplied from the battery unit 10 to the motor M and the motor M is short-circuited, the breaker 20 disconnects the battery unit 10 from the motor M.

The switch unit 30 switches mutual connection among the first to fourth batteries 11 to 14 of the battery unit 10. The switch unit 30 includes a plurality of switches 31 to 38. The switch 31 is provided to the positive side of the first battery 11, and includes a reference terminal 31a and selection terminals 31b to 31d. The reference terminal 31a is connected to the positive electrode of the first battery 11, the selection terminal 31b is connected to the negative electrode of the third battery 13, and the selection terminal 31d is connected to the negative electrode of the second battery 12. The selection terminal 31c is a terminal for disconnecting the first battery 11, and is not electrically connected. The switch 31 switches connection between the reference terminal 31a and each of the selection terminals 31b to 31d based on a switching signal of the switch controller 40. For example, the switch 31 connects the reference terminal 31a with the selection terminal 31b so as to connect the positive electrode of the first battery 11 with the negative electrode of the third battery 13. The switch 31 connects the reference terminal 31a with the selection terminal 31d so as to connect the positive electrode of the first battery 11 with the negative electrode of the second battery 12. The switch 31 connects the reference terminal 31a with the selection terminal 31c so as to make the positive electrode of the first battery 11 not to be electrically connected.

The switch 32 is provided to the negative side of the first battery 11, and includes a reference terminal 32a and selection terminals 32b and 32c. The reference terminal 32a is connected to the negative electrode of the first battery 11, and the selection terminal 32c is connected to the negative electrode of the second battery 12 and the negative electrode of the charger C, and to the negative electrode of the motor M. The selection terminal 32b is a terminal for disconnecting the first battery 11, and is not electrically connected. The switch 32 switches connection between the reference terminal 32a and each of the selection terminals 32b and 32c based on a switching signal of the switch controller 40. For example, the switch 32 connects the reference terminal 32a with the selection terminal 32c so as to connect the negative electrode of the first battery 11 with the negative electrode of the second battery 12 and the negative electrode of the charger C. In addition, the switch 32 connects the reference terminal 32a with the selection terminal 32c so as to connect the negative electrode of the first battery 11 with the negative electrode of the motor M. The switch 32 connects the reference terminal 32a with the selection terminal 32b so as to make the negative electrode of the first battery 11 not to be electrically connected.

The switch 33 is provided to the positive side of the second battery 12, and includes a reference terminal 33a and selection terminals 33b to 33d. The reference terminal 33a is connected to the positive electrode of the second battery 12, the selection terminal 33b is connected to the negative electrode of the fourth battery 14, and the selection terminal 33d is connected to the negative electrode of the third battery 13. The selection terminal 33c is a terminal for disconnecting the second battery 12, and is not electrically connected. The switch 33 switches connection between the reference terminal 33a and each of the selection terminals 33b to 33d based on a switching signal of the switch controller 40. For example, the switch 33 connects the reference terminal 33a with the selection terminal 33b so as to connect the positive electrode of the second battery 12 with the negative electrode of the fourth battery 14. The switch 33 connects the reference terminal 33a with the selection terminal 33d so as to connect the positive electrode of the second battery 12 with the negative electrode of the third battery 13. The switch 33 connects the reference terminal 33a with the selection terminal 33c so as to make the positive electrode of the second battery 12 not to be electrically connected.

The switch 34 is provided to the negative side of the second battery 12, and includes a reference terminal 34a and selection terminals 34b to 34d. The reference terminal 34a is connected to the negative electrode of the second battery 12, and the selection terminal 34b is connected to the positive electrode of the first battery 11. The selection terminal 34d is connected to the negative electrode of the first battery 11 and the negative electrode of the charger C, and to the negative electrode of the motor M. The selection terminal 34c is a terminal for disconnecting the second battery 12, and is not electrically connected. The switch 34 switches connection between the reference terminal 34a and each of the selection terminals 34b to 34d based on a switching signal of the switch controller 40. For example, the switch 34 connects the reference terminal 34a with the selection terminal 34b so as to connect the negative electrode of the second battery 12 with the positive electrode of the first battery 11. The switch 34 connects the reference terminal 34a with the selection terminal 34d so as to connect the negative electrode of the second battery 12 with the negative electrode of the first battery 11 and the negative electrode of the charger C. In addition, the switch 34 connects the reference terminal 34a with the selection terminal 34d so as to connect the negative electrode of the second battery 12 with the negative electrode of the motor M. The switch 34 connects the reference terminal 34a with the selection terminal 34c so as to make the negative electrode of the second battery 12 not to be electrically connected.

The switch 35 is provided to the positive side of the third battery 13, and includes a reference terminal 35a and selection terminals 35b to 35d. The reference terminal 35a is connected to the positive electrode of the third battery 13, the selection terminal 35b is connected to the positive electrode of the fourth battery 14 and the positive electrode of the charger C, and to the positive electrode of the motor M, and the selection terminal 35d is connected to the negative electrode of the fourth battery 14. The selection terminal 35c is a terminal for disconnecting the third battery 13, and is not electrically connected. The switch 35 switches connection between the reference terminal 35a and each of the selection terminals 35b to 35d based on a switching signal of the switch controller 40. For example, the switch 35 connects the reference terminal 35a with the selection terminal 35b so as to connect the positive electrode of the third battery 13 with the positive electrode of the fourth battery 14 and the positive electrode of the charger C. In addition, the switch 35 connects the reference terminal 35a with the selection terminal 35b so as to connect the positive electrode of the third battery 13 with the positive electrode of the motor M. The switch 35 connects the reference terminal 35a with the selection terminal 35d so as to connect the positive electrode of the third battery 13 with the negative electrode of the fourth battery 14. The switch 35 connects the reference terminal 35a with the selection terminal 35c so as to make the positive electrode of the third battery 13 not to be electrically connected.

The switch 36 is provided to the negative side of the third battery 13, and includes a reference terminal 36a and selection terminals 36b to 36d. The reference terminal 36a is connected to the negative electrode of the third battery 13, and the selection terminal 36b is connected to the positive electrode of the second battery 12. The selection terminal 36d is connected to the positive electrode of the first battery 11. The selection terminal 36c is a terminal for disconnecting the third battery 13, and is not electrically connected. The switch 36 switches connection between the reference terminal 36a and each of the selection terminals 36b to 36d based on a switching signal of the switch controller 40. For example, the switch 36 connects the reference terminal 36a with the selection terminal 36b so as to connect the negative electrode of the third battery 13 with the positive electrode of the second battery 12. The switch 36 connects the reference terminal 36a with the selection terminal 36d so as to connect the negative electrode of the third battery 13 with the positive electrode of the first battery 11. The switch 36 connects the reference terminal 36a with the selection terminal 36c so as to make the negative electrode of the third battery 13 not to be electrically connected.

The switch 37 is provided to the positive side of the fourth battery 14, and includes a reference terminal 37a and selection terminals 37b and 37c. The reference terminal 37a is connected to the positive electrode of the fourth battery 14, and the selection terminal 37c is connected to the positive electrode of the third battery 13 and the positive electrode of the charger C, and to the positive electrode of the motor M. The selection terminal 37b is a terminal for disconnecting the fourth battery 14, and is not electrically connected. The switch 37 switches connection between the reference terminal 37a and each of the selection terminals 37b and 37c based on a switching signal of the switch controller 40. For example, the switch 37 connects the reference terminal 37a with the selection terminal 37c so as to connect the positive electrode of the fourth battery 14 with the positive electrode of the third battery 13 and the positive electrode of the charger C. In addition, the switch 37 connects the reference terminal 37a with the selection terminal 37c so as to connect the positive electrode of the fourth battery 14 with the positive electrode of the motor M. The switch 37 connects the reference terminal 37a with the selection terminal 37b so as to make the positive electrode of the fourth battery 14 not to be electrically connected.

The switch 38 is provided to the negative side of the fourth battery 14, and includes a reference terminal 38a and selection terminals 38b to 38d. The reference terminal 38a is connected to the negative electrode of the fourth battery 14, and the selection terminal 38b is connected to the positive electrode of the second battery 12. The selection terminal 38d is connected to the positive electrode of the third battery 13. The selection terminal 38c is a terminal for disconnecting the fourth battery 14, and is not electrically connected. The switch 38 switches connection between the reference terminal 38a and each of the selection terminals 38b to 38d based on a switching signal of the switch controller 40. For example, the switch 38 connects the reference terminal 38a with the selection terminal 38b so as to connect the negative electrode of the fourth battery 14 with the positive electrode of the second battery 12. The switch 38 connects the reference terminal 38a with the selection terminal 38d so as to connect the negative electrode of the fourth battery 14 with the positive electrode of the third battery 13. The switch 38 connects the reference terminal 38a with the selection terminal 38c so as to make the negative electrode of the fourth battery 14 not to be electrically connected.

The switch controller 40 switches connection between the battery unit 10 and the charger C or the motor M and controls the switch unit 30. The switch controller 40 includes a central processing unit (CPU), a read-only memory (ROM) and a random access memory (RAM) forming a storage unit, and an electronic circuit that is mainly composed of a well-known microcomputer including an interface.

When the charger C charges the battery unit 10, the switch controller 40 controls the switch unit 30 with a switching signal and forms, in the battery unit 10, a plurality of serial battery groups for charging B1 that each have the same number of batteries connected in series. In this example, the switch controller 40 forms two serial battery groups for charging B1 that each have two batteries connected in series as illustrated in FIG. 2. For example, the switch controller 40 connects the reference terminal 31a with the selection terminal 31b and connects the reference terminal 36a with the selection terminal 36d so as to form a first serial battery group for charging B1 that has the first battery 11 and the third battery 13 connected in series. The switch controller 40 connects the reference terminal 33a with the selection terminal 33b and connects the reference terminal 38a with the selection terminal 38b so as to form a second serial battery group for charging B1 that has the second battery 12 and the fourth battery 14 connected in series. The switch controller 40 connects the reference terminal 32a with the selection terminal 32c and connects the reference terminal 34a with the selection terminal 34d, and connects the reference terminal 35a with the selection terminal 35b and connects the reference terminal 37a with the selection terminal 37c so as to form a parallel battery group B2 that has the first serial battery group for charging B1 and the second serial battery group for charging B1 connected in parallel. In other words, the switch controller 40 forms the parallel battery group B2 that is a circuit in which two of the first to fourth batteries 11 to 14 of the battery unit 10 are connected in series and two of the first to fourth batteries 11 to 14 of the battery unit 10 are connected in parallel. The switch controller 40 connects the formed parallel battery group B2 with the charger C, and charges the parallel battery group B2 with electric power supplied from the charger C.

When electric power is supplied from the battery unit 10 to the motor M, the switch controller 40 controls the switch unit 30 with a switching signal, and forms a backup battery B3 and a serial battery group for supplying electric power B4a as illustrated in FIG. 3. The backup battery B3 indicates, out of the first to fourth batteries 11 to 14 of the battery unit 10, at least one battery that does not supply electric power to the motor M. In this example, one of the first to fourth batteries 11 to 14 is defined as the backup battery B3, but this is not limiting. A plurality of batteries may be defined as the backup battery B3. The serial battery group for supplying electric power B4a indicates, out of the first to fourth batteries 11 to 14, the remaining batteries except for the backup battery B3 that are connected in series.

For example, the switch controller 40 connects the reference terminal 31a with the selection terminal 31c and connects the reference terminal 32a with the selection terminal 32b so as to disconnect the first battery 11 and define the first battery 11 as the backup battery B3 as illustrated in FIG. 3. The switch controller 40 connects the reference terminal 33a with the selection terminal 33d, connects the reference terminal 36a with the selection terminal 36b, connects the reference terminal 35a with the selection terminal 35d, and connects the reference terminal 38a with the selection terminal 38d so as to form the serial battery group for supplying electric power B4a that has the second to fourth batteries 12 to 14 connected in series. The switch controller 40 connects the reference terminal 34a with the selection terminal 34d and connects the reference terminal 37a with the selection terminal 37c so as to connect the serial battery group for supplying electric power B4a to the motor M and supply electric power from the serial battery group for supplying electric power B4a to the motor M. In this case, the first battery 11 corresponding to the backup battery B3 is broken when fully charged.

When a predetermined condition is satisfied, the switch controller 40 sequentially switches between a battery included in the serial battery group for supplying electric power B4a and the backup battery B3. For example, under the predetermined condition that a vehicle is in a stopping state after the charger C completes charging of the battery unit 10, the switch controller 40 sequentially switches between a battery included in the serial battery group for supplying electric power B4a and the backup battery B3. In this manner, the switch controller 40 can sequentially switch between a battery included in the serial battery group for supplying electric power B4a and the backup battery B3 in a state where the charging amount (charging rate) of the first to fourth batteries 11 to 14 is approximately equal. Thus, the switch controller 40 can prevent a current from flowing between the respective batteries during switching the batteries and can prevent loss of electric power and heating of the batteries.

When a charging amount of the serial battery group for supplying electric power B4a is lowered after electric power is supplied from the serial battery group for supplying electric power B4a to the motor M, the switch controller 40 forms the parallel battery group B2 and causes the charger C to charge the battery unit 10 as illustrated in FIG. 2. In a state where a vehicle stops after charging of the battery unit 10 is completed, the switch controller 40 switches between a battery included in the serial battery group for supplying electric power B4a and the backup battery B3 (first battery 11). For example, the switch controller 40 switches between the second battery 12 included in the serial battery group for supplying electric power B4a and the backup battery B3 (first battery 11). For example, the switch controller 40 controls the switch unit 30 and forms the second battery 12 as the backup battery B3, and forms a serial battery group for supplying electric power B4b that has the first battery 11, the third battery 13, and the fourth battery 14 connected in series as illustrated in FIG. 4. The switch controller 40 connects the serial battery group for supplying electric power B4b to the motor M so as to supply electric power from the serial battery group for supplying electric power B4b to the motor M. In this case, the second battery 12 corresponding to the backup battery B3 is broken when fully charged.

Similarly, when a charging amount of the serial battery group for supplying electric power B4b is reduced after electric power is supplied from the serial battery group for supplying electric power B4b to the motor M, the switch controller 40 forms the parallel battery group B2 and causes the charger C to charge the battery unit 10 as illustrated in FIG. 2. In a state where a vehicle stops after charging of the battery unit 10 is completed, the switch controller 40 switches between the third battery 13 included in the serial battery group for supplying electric power B4b and the backup battery B3 (second battery 12). For example, the switch controller 40 controls the switch unit 30 and forms the third battery 13 as the backup battery B3, and forms a serial battery group for supplying electric power B4c that has the first battery 11, the second battery 12, and the fourth battery 14 connected in series as illustrated in FIG. 5. The switch controller 40 connects the serial battery group for supplying electric power B4c to the motor M so as to supply electric power from the serial battery group for supplying electric power B4c to the motor M. In this case, the third battery 13 corresponding to the backup battery B3 is broken when fully charged.

Similarly, when a charging amount of the serial battery group for supplying electric power B4c is reduced after electric power is supplied from the serial battery group for supplying electric power B4c to the motor M, the switch controller 40 forms the parallel battery group B2 and causes the charger C to charge the battery unit 10 as illustrated in FIG. 2. In a state where a vehicle stops after charging of the battery unit 10 is completed, the switch controller 40 switches between the fourth battery 14 included in the serial battery group for supplying electric power B4c and the backup battery B3 (third battery 13). For example, the switch controller 40 controls the switch unit 30 and forms the fourth battery 14 as the backup battery B3, and forms a serial battery group for supplying electric power B4d that has the first battery 11, the second battery 12, and the third battery 13 connected in series as illustrated in FIG. 6. The switch controller 40 connects the serial battery group for supplying electric power B4d to the motor M so as to supply electric power from the serial battery group for supplying electric power B4d to the motor M. In this case, the fourth battery 14 corresponding to the backup battery B3 is broken when fully charged.

In this manner, the switch controller 40 switches between a battery included in a serial battery group for supplying electric power B4 (B4a to B4d) and the backup battery B3 in a predetermined order as illustrated in FIGS. 3 to 6. In this example, the switch controller 40 switches between a battery included in the serial battery group for supplying electric power B4 and the backup battery B3 in the order of the first battery 11, the second battery 12, the third battery 13, and the fourth battery 14. In other words, the switch controller 40 puts and arranges the batteries in order so as to establish the order, and switches from the lead battery to the backup battery B3 in order. When the order reaches the last battery, the switch controller 40 returns to the lead battery again and switches from the lead battery to the backup battery B3.

Figure 7:
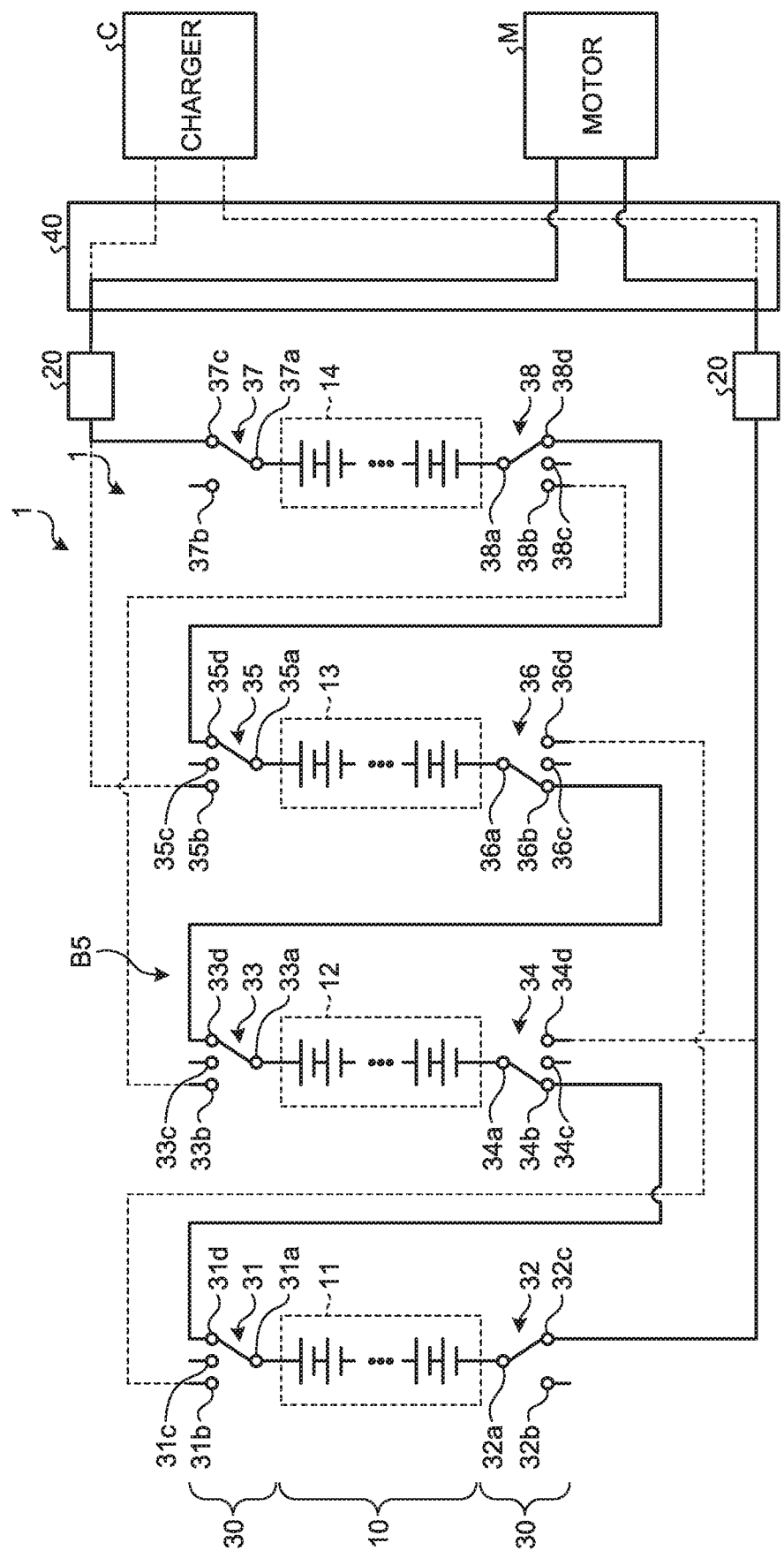
FIG. 7 is a block diagram illustrating an electric power supplying example when a charging amount of the vehicle power supply device according to the embodiment is lowered.

The following describes an electric power supplying example when a charging amount of the vehicle power supply device 1 is lowered. FIG. 7 is a block diagram illustrating an electric power supplying example when a charging amount of the vehicle power supply device 1 according to the embodiment is lowered. When the motor M for traveling is driven, the switch controller 40 determines whether a charging amount of the serial battery group for supplying electric power B4 is sufficient or insufficient based on a predetermined reference charging amount. For example, the switch controller 40 compares a charging amount of the serial battery group for supplying electric power B4 with a reference charging amount, and controls, when the charging amount of the serial battery group for supplying electric power B4 is lowered than the reference charging amount, the switch unit 30 and forms a serial battery group for emergency B5. For example, the switch controller 40 connects all of the first to fourth batteries 11 to 14 including the backup battery B3 in series so as to form the serial battery group for emergency B5 as illustrated in FIG. 7. For example, the switch controller 40 connects the reference terminal 31a with the selection terminal 31d, connects the reference terminal 34a with the selection terminal 34b, connects the reference terminal 33a with the selection terminal 33d, connects the reference terminal 36a with the selection terminal 36b, connects the reference terminal 35a with the selection terminal 35d, and connects the reference terminal 38a with the selection terminal 38d so as to form the serial battery group for emergency B5 that has all of the first to fourth batteries 11 to 14 connected in series. The switch controller 40 connects the reference terminal 32a with the selection terminal 32c, and connects the reference terminal 37a with the selection terminal 37c so as to connect the serial battery group for emergency B5 to the motor M and supply electric power from the serial battery group for emergency B5 to the motor M. When a charging amount of the serial battery group for supplying electric power B4 is equal to or more than a reference charging amount, the switch controller 40 does not form the serial battery group for emergency B5 and maintains the configuration of the serial battery group for supplying electric power B4.

Figure 8:
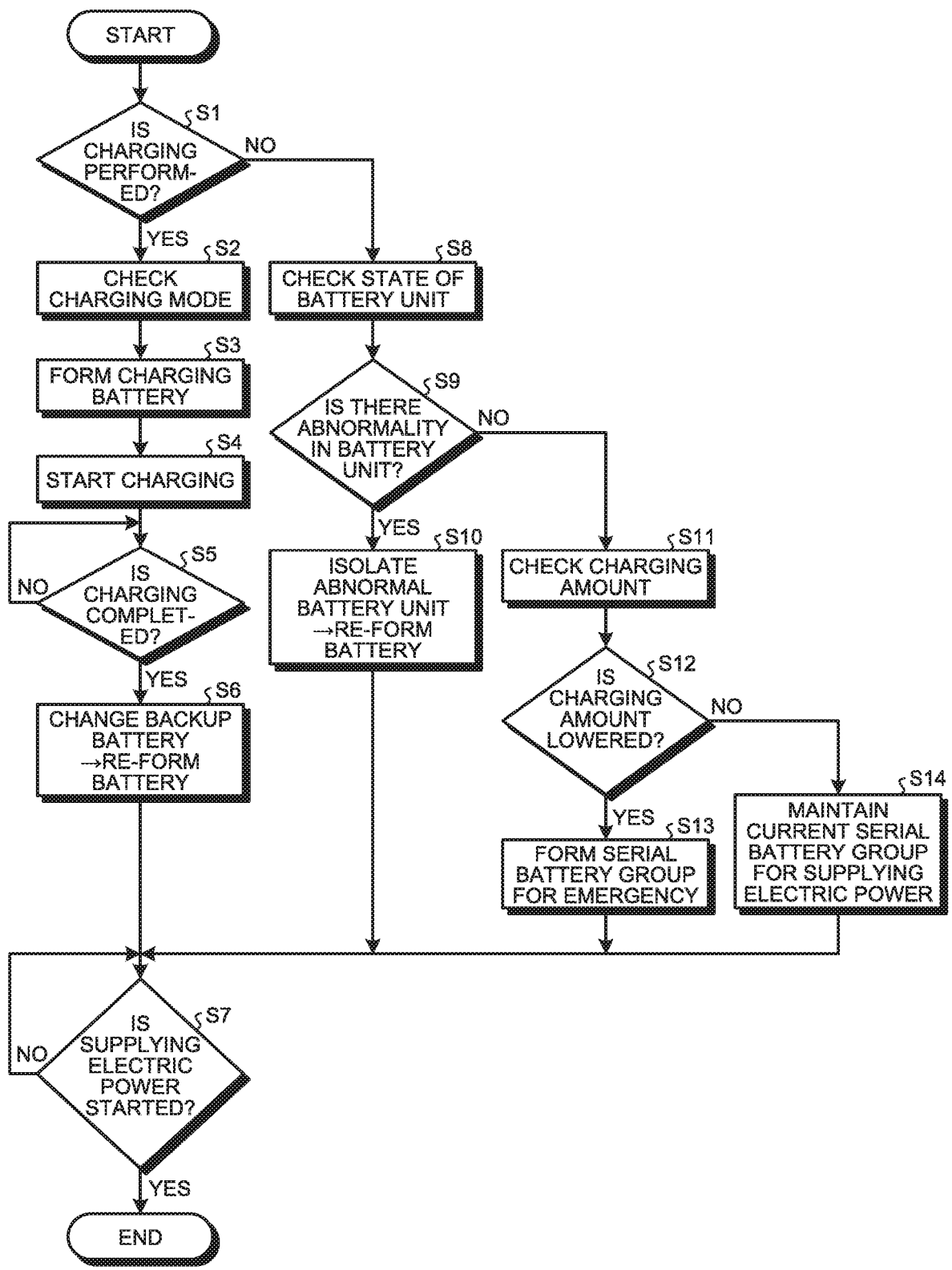
FIG. 8 is a flowchart illustrating an operation example of the vehicle power supply device according to the embodiment.

The following describes an operation example of the vehicle power supply device 1. FIG. 8 is a flowchart illustrating an operation example of the vehicle power supply device 1 according to the embodiment. In the vehicle power supply device 1, the switch controller 40 determines whether charging is performed as illustrated in FIG. 8 (step S1). For example, when detecting connection of a connector of the charger C to an inlet of a vehicle, the switch controller 40 determines that charging is performed. When charging is performed (Yes at step S1), the switch controller 40 checks a charging mode (step S2) and forms the parallel battery group for charging B2 (step S3). For example, the switch controller 40 forms a circuit in which two of the first to fourth batteries 11 to 14 of the battery unit 10 are connected in series and two of the first to fourth batteries 11 to 14 of the battery unit 10 are connected in parallel as the parallel battery group B2. The switch controller 40 charges the parallel battery group B2 with electric power supplied from the charger C, and maintains charging until the charging is completed (step S4).

The switch controller 40 determines whether charging is completed (step S5). For example, when detecting removal of a connector of the charger C from an inlet of a vehicle, the switch controller 40 determines that charging is completed (Yes at step S5), but this is not limiting. The switch controller 40 may determine completion of charging by another method. After charging is completed, the switch controller 40 changes the backup battery B3 and re-forms the serial battery group for supplying electric power B4 (step S6). Subsequently, the switch controller 40 determines whether supplying electric power to the motor M is started (step S7). When supplying electric power to the motor M is started (Yes at step S7), the switch controller 40 supplies the electric power to the motor M and ends the processing.

By contrast, when charging is not performed at step S1 (No at step S1), the switch controller 40 checks a state of the battery unit 10 (step S8). For example, the switch controller 40 checks whether there is abnormality such as short circuit in the first to fourth batteries 11 to 14 of the battery unit 10 (step S9). When detecting abnormality in any of the first to fourth batteries 11 to 14 (Yes at step S9), the switch controller 40 isolates the battery and re-forms the serial battery group for supplying electric power B4 with the other batteries (step S10). For example, the switch controller 40 isolates the abnormal battery, re-forms a state to any of the connection states of the serial battery groups for supplying electric power B4a to B4d (see FIGS. 3 to 6), and supplies electric power to the motor M.

When not detecting abnormality in the first to fourth batteries 11 to 14 at step S9 (No at step S9), the switch controller 40 checks a charging amount of the serial battery group for supplying electric power B4 (step S11) and determines whether the charging amount is lowered than a reference charging amount (step S12). When a charging amount of the serial battery group for supplying electric power B4 is lowered than a reference charging amount (Yes at step S12), the switch controller 40 forms the serial battery group for emergency B5 (step S13). For example, the switch controller 40 connects all of the first to fourth batteries 11 to 14 including the backup battery B3 in series so as to form the serial battery group for emergency B5, and supplies electric power to the motor M. When a charging amount of the serial battery group for supplying electric power B4 is not lowered than a reference charging amount (No at step S12), the switch controller 40 maintains the current serial battery group for supplying electric power B4 (step S14) and supplies electric power to the motor M. When charging is not completed at step S5 (No at step S5), the switch controller 40 repeatedly determines whether charging is completed. When supplying electric power to the motor M is not started at step S7 (No at step S7), the switch controller 40 repeatedly determines whether supplying electric power to the motor M is started.

As above, the vehicle power supply device 1 according to the embodiment includes the first to fourth batteries 11 to 14, the switch unit 30, and the switch controller 40. The first to fourth batteries 11 to 14 are mounted on a vehicle, and supply electric power to the motor M. The switch unit 30 switches mutual connection among the first to fourth batteries 11 to 14. When electric power is supplied from the first to fourth batteries 11 to 14 to the motor M, the switch controller 40 controls the switch unit 30, and forms the backup battery B3 corresponding to at least one of the first to fourth batteries 11 to 14 that does not supply electric power to the motor M and the serial battery group for supplying electric power B4 that has the remaining batteries except for the backup battery B3 connected in series. The switch controller 40 supplies electric power from the serial battery group for supplying electric power B4 to the motor M, and sequentially switches between a battery included in the serial battery group for supplying electric power B4 and the backup battery B3 when a predetermined condition is satisfied.

With this configuration, the vehicle power supply device 1 switches the backup battery B3 in the first to fourth batteries 11 to 14 in rotation so as to make the respective use frequency of the first to fourth batteries 11 to 14 approximately equal. In this manner, the vehicle power supply device 1 can reduce variation in deterioration states (states of health (SOH)) of the first to fourth batteries 11 to 14. In the vehicle power supply device 1, the backup battery B3 is included in the first to fourth batteries 11 to 14, and each of the batteries can be considered as the same type of battery and it is not necessary to provide a battery monitoring unit and the like specifically for a backup battery unlike a conventional manner. Thus, the vehicle power supply device 1 can reduce an increase in the number of components and reduce production cost. In the case of abnormality in the serial battery group for supplying electric power B4, the vehicle power supply device 1 can supply electric power using the backup battery B3 and can prevent a decrease in reliability. Thus, the vehicle power supply device 1 can properly build a power supply system having a backup function.

In the vehicle power supply device 1, when the charger C charges the first to fourth batteries 11 to 14, the switch controller 40 controls the switch unit 30 and forms, among the first to fourth batteries 11 to 14, a plurality of the serial battery groups for charging B1 that each have the same number of batteries connected in series. The switch controller 40 forms the parallel battery group B2 that has each of the serial battery groups for charging B1 connected in parallel, and charges the parallel battery group B2 with electric power supplied from the charger C. With this configuration, the vehicle power supply device 1 can charge the first to fourth batteries 11 to 14 at a predetermined voltage at the same time.

In the vehicle power supply device 1, when a charging amount of the serial battery group for supplying electric power B4 is lowered than a predetermined reference charging amount, the switch controller 40 controls the switch unit 30, forms the serial battery group for emergency B5 that has all of the first to fourth batteries 11 to 14 including the backup battery B3 connected in series, and supplies electric power from this serial battery group for emergency B5 to the motor M. With this configuration, even when a charging amount of the serial battery group for supplying electric power B4 is lowered, the vehicle power supply device 1 can continue traveling of a vehicle and enables the vehicle to move to a safe location.

Modification

The following describes a modification of the embodiment. The above describes an example in which the battery unit 10 includes the four batteries that are the first to fourth batteries 11 to 14, but this number is not limiting.

An example has been described in which the backup battery B3 is one battery, but this is not limiting. The number of the backup battery B3 may be plural.

An example has been described in which, when completion of charging and a stopping state of a vehicle are defined as a predetermined condition and this condition is satisfied, the switch controller 40 sequentially switches between a battery included in the serial battery group for supplying electric power B4a and the backup battery B3, but this is not limiting. For example, a travel distance of a vehicle, the number of times of battery charging, and the like may be considered as a predetermined condition. For example, when a travel distance of a vehicle exceeds a predetermined reference distance, the switch controller 40 may switch between a battery included in the serial battery group for supplying electric power B4a and the backup battery B3 after charging is completed and in a state where the vehicle stops. When the number of times of battery charging exceeds a predetermined reference number of times, the switch controller 40 may switch between a battery included in the serial battery group for supplying electric power B4a and the backup battery B3 after charging is completed and in a state where a vehicle stops.

An example has been described in which, when the charger C charges the first to fourth batteries 11 to 14, the switch controller 40 forms, among the first to fourth batteries 11 to 14, a plurality of the serial battery groups for charging B1 that each have the same number of batteries connected in series, but this is not limiting. The first to fourth batteries 11 to 14 may be charged by another connection form.

An example has been described in which, when a charging amount of the serial battery group for supplying electric power B4 is lowered than a predetermined reference charging amount, the switch controller 40 causes the serial battery group for emergency B5 to supply electric power to the motor M, but this is not limiting. Electric power may be supplied to the motor M by another method.

When an abnormal battery is included in the first to fourth batteries 11 to 14, the switch controller 40 may disconnect the abnormal battery and form the serial battery group for supplying electric power B4 with the remaining batteries.

By making the first to fourth batteries 11 to 14 removable, the battery unit 10 may facilitate replacement of each battery. Thus, the battery unit 10 can promote recycling, reuse, and the like of batteries. By replacing the first to fourth batteries 11 to 14 with charged batteries, the battery unit 10 can reduce a charging time and is expected to be used for car sharing and the like.

The vehicle power supply device according to the present embodiment sequentially switches between a battery included in a serial battery group for supplying electric power and a backup battery so as to reduce variation in deterioration state of each battery. Thus, the vehicle power supply device can properly build a power supply system having a backup function.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle power supply device comprising:
   a plurality of batteries that are mounted on a vehicle and supply electric power to a load unit;
   a switching unit that is configured to switch mutual connection among the batteries; and
   a controller that is configured to control the switching unit, wherein
   when supplying electric power from the batteries to the load unit, the controller controls the switching unit, forms a backup battery that is at least one of the batteries that does not supply electric power to the load unit and a serial battery group for supplying electric power that has the remaining batteries, except for the backup battery, connected in series, supplies electric power from the serial battery group for supplying electric power to the load unit, and, when a predetermined condition is satisfied, sequentially switches ones of the batteries included in the serial battery group for supplying electric power as the backup battery and also switches the backup battery as the ones of the batteries included in the serial battery group for supplying electric power.

2. The vehicle power supply device according to claim 1, wherein
   when a charger charges the batteries, the controller controls the switching unit, forms, among the batteries, a plurality of serial battery groups for charging that each have the same number of batteries connected in series and forms a parallel battery group that has the serial battery groups for charging connected in parallel, and charges the parallel battery group with electric power supplied from the charger.

3. The vehicle power supply device according to claim 1, wherein
   when a charging amount of the serial battery group for supplying electric power is lowered than a predetermined reference charging amount, the controller controls the switching unit, forms a serial battery group for emergency that has all of the batteries including the backup battery connected in series, and supplies electric power from the serial battery group for emergency to the load unit.

4. The vehicle power supply device according to claim 2, wherein
   when a charging amount of the serial battery group for supplying electric power is lowered than a predetermined reference charging amount, the controller controls the switching unit, forms a serial battery group for emergency that has all of the batteries including the backup battery connected in series, and supplies electric power from the serial battery group for emergency to the load unit.

5. The vehicle power supply device according to claim 1,
   wherein the batteries comprise at least a first battery, a second battery, and a third battery,
   wherein when the first battery is set as the backup battery then at least the second battery and the third battery are set as the serial battery group such that the first battery does not supply electric power to the load unit and such that at least the second battery and the third battery supply electric power to the load unit, and
   wherein sequentially switching the ones of the batteries in the serial battery group as the backup battery comprises setting the second battery as the backup battery and the first battery in place of the second battery as part of the serial battery group such that the second battery does not supply electric power to the load unit and such that at least the first battery and the third battery supplies electric power to the load unit.

* * * * *